United States Patent
Yamanaka et al.

(10) Patent No.: US 6,927,185 B2
(45) Date of Patent: Aug. 9, 2005

(54) POROUS MATERIAL AND METHOD FOR PREPARATION THEREOF

(75) Inventors: Shoji Yamanaka, Hiroshima (JP); Toshiyuki Sasaki, Hiroshima (JP)

(73) Assignee: Japan Science and Technology Corporation, Kawaguchi (JP)

( * ) Notice: Subject to any disclaimer, the term of this patent is extended or adjusted under 35 U.S.C. 154(b) by 303 days.

(21) Appl. No.: 10/239,173

(22) PCT Filed: Jan. 11, 2002

(86) PCT No.: PCT/JP02/00166
§ 371 (c)(1),
(2), (4) Date: Sep. 25, 2002

(87) PCT Pub. No.: WO02/060835
PCT Pub. Date: Aug. 8, 2002

(65) Prior Publication Data
US 2003/0064015 A1 Apr. 3, 2003

(30) Foreign Application Priority Data
Jan. 29, 2001 (JP) .......................... 2001-19740

(51) Int. Cl.⁷ .......................... B01J 20/02; B01J 27/14; C01B 25/36; C03C 3/17; C03C 11/00
(52) U.S. Cl. .......................... 501/39; 423/311; 501/47; 501/48; 502/202; 502/208; 502/414
(58) Field of Search .............................. 501/39, 48, 47; 423/307, 308, 309, 311; 502/202, 208, 414

(56) References Cited

U.S. PATENT DOCUMENTS

| 4,080,311 A | * | 3/1978 | Kehl | 502/208 |
| 4,622,310 A | * | 11/1986 | Iacobucci | 502/208 |
| 5,001,102 A | * | 3/1991 | Wells | 502/213 |
| 5,030,431 A | * | 7/1991 | Glemza | 423/305 |
| 5,178,846 A | | 1/1993 | Buelow et al. | |
| 5,951,963 A | | 9/1999 | He et al. | |
| 6,022,513 A | * | 2/2000 | Pecoraro et al. | 423/311 |

FOREIGN PATENT DOCUMENTS

| EP | 0 811 423 A1 | 12/1997 |
| JP | 63-201020 | 8/1988 |
| JP | 5-116918 | 5/1993 |
| JP | 10-87321 | 4/1998 |
| JP | 10-297918 | 11/1998 |
| JP | 2001-226172 | 8/2001 |

* cited by examiner

*Primary Examiner*—Wayne Langel
(74) *Attorney, Agent, or Firm*—Armstrong, Kratz, Quintos, Hanson & Brooks, LLP

(57) ABSTRACT

As-prepared $AlPO_4$—$B_2O_3$—$Na_2O$-based glasses were placed in an autoclave together with distilled water and were treated at 150° C. for two hours. Although the specific surface area of the as-prepared glass prior to autoclave treatment was negligibly small, the autoclave treatment dissolved most of the borate component and the sodium component to obtain a mesoporous material having a specific surface area of 236 m²/g and a pore size distribution of 5 to 10 nm. This mesoporous material is hydrophobic and has weak solid acidity and small polarity.

4 Claims, 2 Drawing Sheets

POROUS MATERIAL AND METHOD FOR PREPARATION THEREOF

TECHNICAL FIELD

The present invention relates to ceramic porous materials and their manufacturing process.

BACKGROUND ART

Porous materials are classified into microporous materials, mesoporous materials and macroporous materials according to their pore sizes. Although the boundary of the classification is not clear, it is roughly divided into the following; microporous materials with pore sizes ranging less than about 2 nm, mesoporous materials with pore sizes ranging from about 2 to 50 nm, and macroporous materials with pore sizes ranging about more than 50 nm.

Microporous materials include zeolites and pillared clays. Typical mesoporous materials include xerogels such as silica gels and silica alumina gels, and porous glasses synthesized using phase-separation of glasses. Mesoporous materials are widely utilized in chemical industries as adsorvents for separation and purification of materials, catalysts, catalyst supports, supports for enzyme immobilization and so on. Microporous materials have the functions of selective adsorption of molecules based on their pore sizes, which are therefore used mainly for small size molecules, while mesoporous materials have larger pore sizes and have widespread demands over general processes of chemical industries. In these days, the demands for porous materials are concerned not only with the pore sizes, pore size distribution, and surface area, but also with the chemical interaction with adsorbates; the demands include mesoporous materials having weak solid acidity, and porous materials having hydrophobicity. The demands on the materials are diverse and mesoporous materials using new materials are required.

As conventional mesoporous materials, xerogels based on silica or alumina and porous glasses have been mainly used. These porous materials have a feature of strong solid acidity and are used for cracking catalysts and the like; however, its strong solid acidity limits applications. For this reason, hydrophobic mesoporous materials of weak solid acidity and small polarity are eagerly awaited.

On the other hand, while various aluminum phosphate ($AlPO_4$)-based porous materials are known and are receiving attention as hydrophobic adsorbing materials of weak acidity, all the $AlPO_4$-based porous materials known so far are microporous materials. For example, materials with a maximum pore size are $AlPO_4$—H1 or VPI-5, containing oxygen 18-membered rings, the pore sizes of which are only 1 nm. The emergence of $AlPO_4$-based mesoporous materials having a pore size of 2 nm or larger is awaited with hope.

It is an object of the present invention to provide mesoporous materials with hydrophobic, weak solid acidity and small polarity.

DISCLOSURE OF THE INVENTION

The present inventors have invented aluminum phosphate-based mesoporous materials as substitutes for conventional silica or an alumina-based mesoporous materials.

The term "mesoporous materials" herein is not confined to the general definition, but refers to even materials with pores of a size ranging wider than that of the aforementioned mesoporous materials.

The present inventors have successfully synthesized mesoporous materials with desired pore sizes and pore distributions by using aluminum phosphate based glasses and by dissolving easily soluble portions. This is in contrast with the method using the conventional phase-separated glasses of silica-basis.

The present inventors have successfully synthesized $AlPO_4$-based mesoporous materials in an effort to study the detailed glass formation region of the three-component system of $AlPO_4$—$B_2O_3$—$R_2O$ (in which R represents an alkali metals).

That is, the present invention is $AlPO_4$-based mesoporous materials containing $AlPO_4$ as a main component and having pores with a pore diameter of 2 nm or larger.

In order to manufacture the $AlPO_4$-based mesoporous materials, the manufacturing method of the present invention includes the following steps (A) and (B):

(A) a step of preparing glass containing as main components $AlPO_4$, $B_2O_3$ (boron oxide) and $R_2O$; and (B) a step of obtaining porous materials by dissolving at least parts of the $B_2O_3$ component and the $R_2O$ component from the aforementioned glass in water, or a weak acid, or a weak alkaline aqueous solution.

For the dissolution, hot water is usually used. In order to control the amount of dissolution and the rate of dissolution, a weak acid or a weak alkaline aqueous solution can also be used.

In a preferable method, the aforementioned glass is first crystallized by thermal treatment After that, the $B_2O_3$ component and the $R_2O$ component are dissolved in water, or a weak acid or a weak alkaline aqueous solution. The water temperature during dissolution is in a range from 50 to 200° C., most desirably from 90 to 160° C.

In another preferable method, the as-prepared glass is used, and the $B_2O_3$ component and the $R_2O$ component are dissolved in water, or a weak acid or a weak alkaline aqueous solution. The dissolution is performed at a water temperature of 50 to 200° C., most desirably 50 to 150° C.

When the water temperature during dissolution exceeds 100° C., the water evaporation is prevented by using an autoclave.

When Na is used as the alkali metal R, and in compositions, $AlPO_4$ is x, $B_2O_3$ is y and $R_2O$ is z, a preferable composition of the aforementioned glass prior to dissolving the $B_2O_3$ component and the $R_2O$ component is in a range of 10 to 50 mol % for x, 75 to 15 mol % for y and 15 to 40 mol % for z.

According to the present invention, mesoporous materials containing $AlPO_4$ as a main component and having pores with a pore diameter of 2 nm or larger are obtained. Since the mesoporous materials are hydrophobic and have weak solid acidity and small polarity, the mesoporous materials can be widely utilized in chemical industries as adsorvents for separation and purification of materials, catalysts, catalyst supports, supports for enzyme immobilization and the like.

In addition, according to the manufacturing method of mesoporous materials of the present invention, glasses containing $AlPO_4$, $B_2O_3$ and $R_2O$ (R represents alkali metals) as main components are prepared and then at least part of the $B_2O_3$ component and the $R_2O$ component are dissolved from the glass to thereby obtain the porous materials, and thus the manufacturing is easy.

BEST MODE FOR CARRYING OUT THE INVENTION

Figure 1:
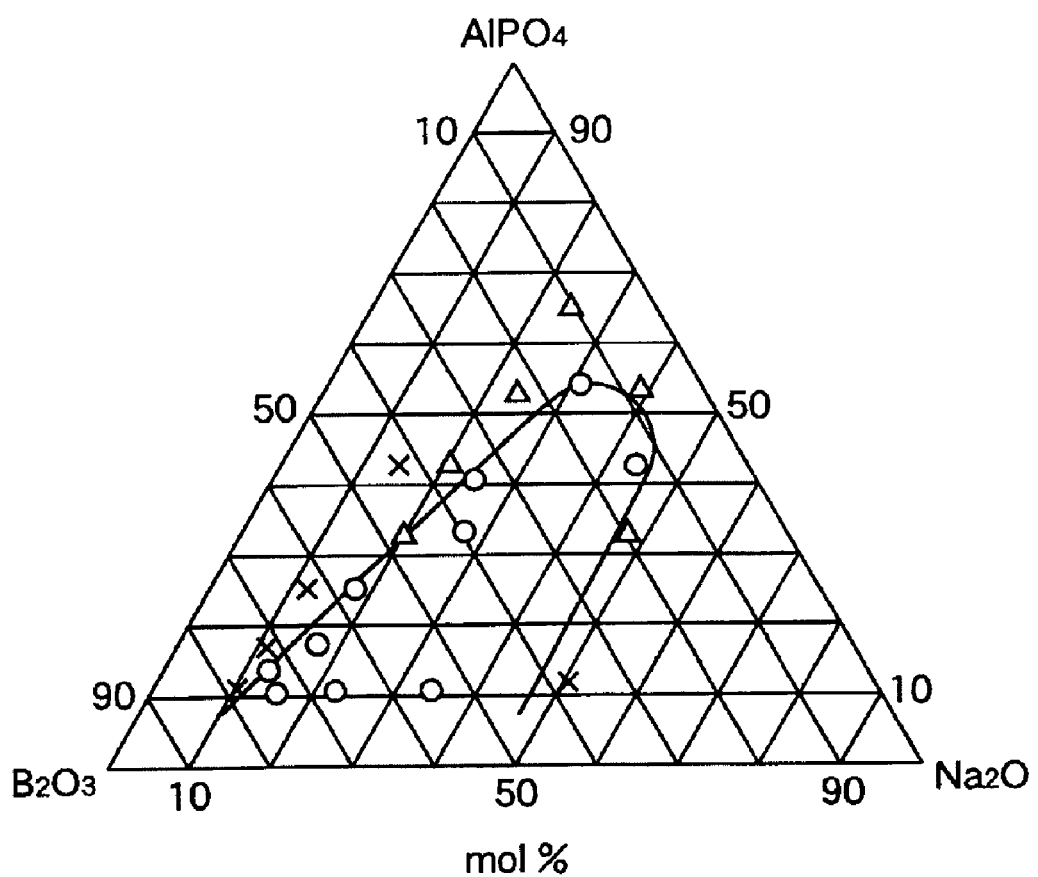
FIG. 1 shows the glass formation range in the glass system of $AlPO_4$—$B_2O_3$—$R_2O$ in an example.

A glass containing $AlPO_4$, $B_2O_3$ and $R_2O$ as main components is prepared. A mesoporous material is synthesized using this glass as starting material by dissolving part or most of the $B_2O_3$ and $R_2O$ components in hot water, for example, in water at 80 to 150° C. after the crystallization of the glass by thermal treatment, or by using the as-prepared glass without such thermal treatment. $AlPO_4$ can be prepared from $Al_2O_3$ and $P_2O_5$. At this time, the molar ratio of $Al_2O_3$ to $P_2O_5$ ($Al_2O_3/P_2O_5$) is suitably in a range from 0.6 to 1.4; however, the molar ratio is preferably close to approximately 1.

Raw materials used for preparing $Al_2O_3$ may include aluminum oxide, various aluminum hydroxides and boehmite. Raw materials used for preparing $P_2O_5$ may include phosphoric acid, various alkali or ammonium phosphates, and mixtures thereof. Raw materials used for preparing $B_2O_3$ may include boric acid and various alkali borates. Raw materials used for preparing $R_2O$ may include various carbonates and hydrogencarbonates.

Other components may include, as required, $SiO_2$, $TiO_2$ and various alkaline earth oxides, although not essential to the synthesis of porous materials, but can be used as additives, in order to facilitate vitrification and improve chemical resistivity and mechanical properties.

The raw materials are mixed in such a way to obtain specific mixing ratios and the resulting mixtures are calcined until melting after the mixtures are thermally decomposed using a platinum or a porcelain crucible, and then the products are rapidly cooled to yield molten glasses. This glass, after crystallization by thermal treatment or in the form of as—prepared glass without thermal treatment, is treated in hot water to dissolve part or most of the $R_2O$ and $B_2O_3$ components, resulting in formation of crystalline or amorphous mesoporous materials having $AlPO_4$ as a main component.

The present invention will be described more specifically using examples hereinafter; however, the present invention is not limited thereto.

EXAMPLE 1

(Determination of the Glass Formation Range)

Ammonium dihydrogenphosphate, boehmite, boron oxide and sodium carbonate were mixed in various ratios and the resulting mixtures were completely melted by heating at 1200 to 1500° C. for about one hour and then were rapidly cooled by placing into water. Table 1 shows molar compositions of the synthesized oxides of the samples and statuses of the vitrification thereof. Raw materials were mixed for preparation so that the ratio Al/P became 1.

The mark ○ denotes transparent glass, the mark Δ denotes partly opaque glass, and the mark x means that crystallization occurred so that the above method could not give vitrified material.

TABLE 1

Vitrification ranges of the $AlPO_4$—$B_2O_3$—$Na_2O$ system
Mol %

| No. | $AlPO_4$ | $B_2O_3$ | $Na_2O$ | Vitrification status |
|---|---|---|---|---|
| 1 | 11.10 | 72.23 | 16.67 | ○ |
| 2 | 11.10 | 66.65 | 22.24 | ○ |
| 3 | 11.11 | 55.56 | 33.33 | ○ |
| 4 | 14.28 | 72.00 | 13.72 | ○ |
| 5 | 17.64 | 64.71 | 17.65 | ○ |
| 6 | 24.99 | 56.26 | 18.75 | ○ |
| 7 | 33.33 | 40.00 | 26.67 | ○ |
| 8 | 40.00 | 35.00 | 25.00 | ○ |
| 9 | 42.85 | 14.29 | 42.86 | ○ |
| 10 | 53.85 | 15.38 | 30.77 | ○ |
| 11 | 33.33 | 46.67 | 20.00 | Δ |
| 12 | 33.33 | 20.00 | 46.67 | Δ |
| 13 | 42.86 | 35.71 | 21.43 | Δ |
| 14 | 53.75 | 23.22 | 23.03 | Δ |
| 15 | 53.84 | 7.70 | 38.46 | Δ |
| 16 | 66.67 | 8.33 | 25.00 | Δ |
| 17 | 11.10 | 77.79 | 11.11 | X |
| 18 | 11.11 | 38.89 | 50.00 | X |
| 19 | 17.64 | 70.60 | 11.76 | X |
| 20 | 25.00 | 62.50 | 12.50 | X |
| 21 | 42.72 | 42.96 | 14.32 | X |

FIG. 1 shows the vitrification range determined on the basis of these data. The results of FIG. 1 show that when $AlPO_4$ is x, $B_2O_3$ is y and $R_2O$ is z, a composition which vitrifies $AlPO_4$—$B_2O_3$—$Na_2O$-based glass is in a range of 10 to 50 mol % for x, 75 to 15 mol % for y and 15 to 40 mol % for z.

(Treatment of Preparing Porous Glass)

Among these glass samples, the sample 6 was treated by the following two treatment methods 1 and 2, and porous materials were prepared by dissolving the $B_2O_3$ component and the $Na_2O$ component.

(1) Treatment Method 1 of Preparing Porous Glass

The glass of the sample 6 was thermally treated for crystallization at 520° C. for two days. Then it was kept in hot water at 90° C. for one day. As a result, a porous material was obtained with a specific surface area of 109 $m^2/g$ and a pore volume of 0.28 mL/g.

In the nitrogen adsorption isotherm measured on this porous material at a liquid nitrogen temperature, a sudden increase in the adsorption was observed in the vicinity of the saturated vapor pressure, showing that the material had a large pore volume and a mesoporous material was obtained. The analytical results of this porous material showed that about 80% of the charged compositions of the boric acid component and the sodium component was dissolved by the hot water treatment.

(2) Treatment Method 2 of Preparing Porous Glass

Figure 2:
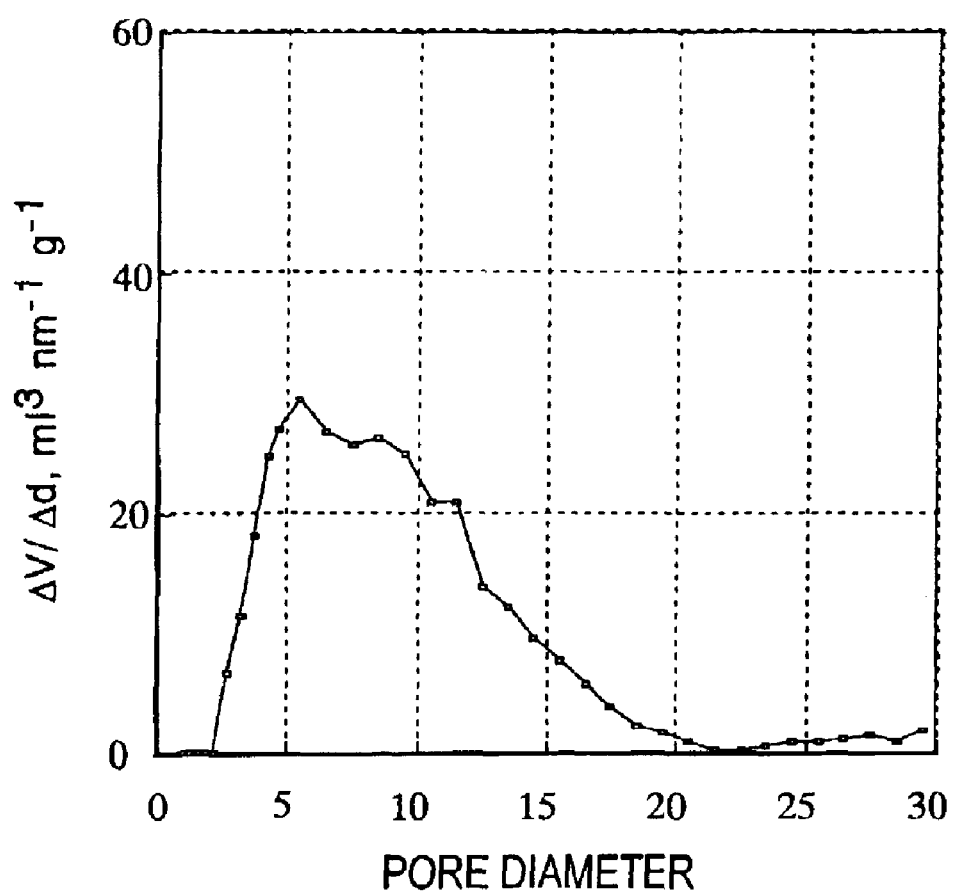
FIG. 2 shows a pore size distribution of the porous material obtained from the example.

The glass of the as-prepared sample 6 without thermal treatment was placed in an autoclave together with distilled water, and was treated at 150° C. for two hours. The porous material thus obtained was vacuum-dried at 200° C. for two hours and its nitrogen adsorption curve was measured. FIG. 2 shows a pore size distribution evaluated from the nitrogen adsorption curve. Although the specific surface area of glass prior to the autoclave treatment was negligibly small, the autoclave treatment dissolved most of the borate component and the sodium component to obtain a mesoporous material having a specific surface area of 236 $m^2/g$ and a pore size distribution of 5 to 10 nm.

Although the examples have shown only the case where Na was used as the alkali metal R, $R_2O$ (R=Li or K), which are similar to $Na_2O$ and classified as modification oxides of glass formation, can be used instead of $Na_2O$. In addition, R is not necessarily limited to one kind of material, but may be a combination of two or more kinds thereof.

INDUSTRIAL APPLICABILITY

Since the mesoporous material of the present invention is hydrophobic and has weak solid acidity and small polarity, it is possible to be widely utilized in chemical industries as adsorvents for separation and purification of materials, catalysts, catalyst supports, supports for enzyme immobilization and the like.

What is claimed is:

1. An $AlPO_4$-based mesoporous material containing $AlPO_4$, $B_2O_3$, and $R_2O$, in which R represents an alkali metal, and having pores with a pore diameter of 2 nm or larger.

2. A manufacturing method for a mesoporous material, comprising the steps of:

(A) preparing a glass containing $AlPO_4$, $B_2O_3$ and $R_2O$ (in which R represents an alkali metal) as main components; and (B) obtaining a porous material by dissolving at least parts of the $B_2O_3$ component and the $R_2O$ component from the glass in a liquid selected from the group consisting of water, a weak acid aqueous solution and a weak alkaline aqueous solution.

3. The manufacturing method for a mesoporous material according to claim 2 wherein the glass is crystallized by thermal treatment prior to dissolving the $B_2O_3$ component and the $R_2O$ component.

4. The manufacturing method for a mesoporous material according to claim 2 or 3, wherein:

alkali metal R is Na, and the glass in step (A) has a composition in the range of 10 to 50 mol % of $AlPO_4$, 75 to 15 mol % of $B_2O_3$, and 15 to 40 mol % of $R_2O$.

* * * * *